US012688803B2

(12) United States Patent
Zhang et al.

(10) Patent No.: US 12,688,803 B2
(45) Date of Patent: Jul. 21, 2026

(54) VEHICLE DISPLAY CONTROL DEVICE, VEHICLE DISPLAY DEVICE, DISPLAY CONTROL METHOD, AND NON-TRANSITORY MEMORY MEDIUM

(71) Applicant: TOYOTA JIDOSHA KABUSHIKI KAISHA, Toyota (JP)

(72) Inventors: Yuting Zhang, Toyota (JP); Takahiro Hirota, Nukata-gun (JP); Koei Maejima, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 168 days.

(21) Appl. No.: 18/757,319

(22) Filed: Jun. 27, 2024

(65) Prior Publication Data

US 2024/0346966 A1     Oct. 17, 2024

Related U.S. Application Data

(63) Continuation of application No. 17/660,064, filed on Apr. 21, 2022, now Pat. No. 12,057,038.

(30) Foreign Application Priority Data

Jun. 9, 2021     (JP) ................................ 2021-096915

(51) Int. Cl.
*G09G 3/00* (2006.01)
*B60K 35/23* (2024.01)
(Continued)

(52) U.S. Cl.
CPC ............. *G09G 3/002* (2013.01); *B60K 35/23* (2024.01); *B60K 35/285* (2024.01); *B60K 35/81* (2024.01);
(Continued)

(58) Field of Classification Search
CPC ........... B60K 35/23; G06T 7/70; G09G 3/002
See application file for complete search history.

(56) References Cited

U.S. PATENT DOCUMENTS

| | | | |
|---|---|---|---|
| 2017/0240109 A1* | 8/2017 | Kimura | .................. G08G 1/167 |
| 2018/0240258 A1 | 8/2018 | Kosaka et al. | |

(Continued)

FOREIGN PATENT DOCUMENTS

| | | |
|---|---|---|
| JP | 6536855 B2 | 7/2019 |
| JP | 2021-24556 A | 2/2021 |

*Primary Examiner* — Matthew Salvucci
(74) *Attorney, Agent, or Firm* — Oblon, McClelland, Maier & Neustadt, L.L.P.

(57)     ABSTRACT

A vehicle display control device comprising memory and a processor coupled to the memory. The processor being configured to perform control to detect a position of a preceding vehicle running in front of the vehicle, based on the position of the preceding vehicle, perceive whether or not an entirety of the preceding vehicle has departed from the display region, and display an acquisition image that is superimposed on or adjacent to the preceding vehicle in the display region in accordance with the position of the preceding vehicle and, when the entirety of the preceding vehicle departing from the display region is perceived, display the acquisition image as a flashing display at an end portion at a side of the display region at which the entirety of the preceding vehicle has departed.

17 Claims, 8 Drawing Sheets

(51) Int. Cl.

| | |
|---|---|
| *B60K 35/28* | (2024.01) |
| *B60K 35/81* | (2024.01) |
| *B60K 37/20* | (2024.01) |
| *G06T 7/70* | (2017.01) |
| *G06V 20/58* | (2022.01) |
| *B60K 35/29* | (2024.01) |
| *B60K 35/60* | (2024.01) |

(52) U.S. Cl.
CPC ................ *B60K 37/20* (2024.01); *G06T 7/70* (2017.01); *G06V 20/58* (2022.01); *B60K 35/28* (2024.01); *B60K 35/29* (2024.01); *B60K 35/60* (2024.01); *B60K 2360/176* (2024.01); *G09G 2380/10* (2013.01)

(56) References Cited

U.S. PATENT DOCUMENTS

| | | | |
|---|---|---|---|
| 2019/0039609 A1 | 2/2019 | Wood | |
| 2022/0398952 A1 | 12/2022 | Zhang | |

\* cited by examiner

28

52

PRECEDING VEHICLE
DETECTION SECTION

54

DEPARTURE
PERCEPTION SECTION

56

IMAGE GENERATION
SECTION

58

DISPLAY CONTROL
SECTION

VEHICLE DISPLAY CONTROL DEVICE, VEHICLE DISPLAY DEVICE, DISPLAY CONTROL METHOD, AND NON-TRANSITORY MEMORY MEDIUM

CROSS-REFERENCE TO RELATED APPLICATION

This application is a continuation of U.S. application Ser. No. 17/660,064 filed Apr. 21, 2022, which is based on and claims priority under 35 USC 119 from Japanese Patent Application No. 2021-096915 filed Jun. 9, 2021, the entire contents of each of which is incorporated by reference herein.

BACKGROUND

Technical Field

The present disclosure relates to a vehicle display control device, a vehicle display device, a display control method, and a non-transitory memory medium.

Related Art

A technology is disclosed in, for example, Japanese Patent No. 6,536,855 in which a marker image or the like is superimposed by a head-up display device on a forward view that an occupant of a vehicle sees through a windshield glass. In Japanese Patent No. 6,536,855, the marker image is displayed together with a preceding vehicle to indicate acquisition of the preceding vehicle. When the preceding vehicle is departing to outside a display region of the head-up display device through a vehicle width direction end of the display region, the display of the marker image is altered cyclically over time.

However, in the technology recited in Japanese Patent No. 6,536,855, the marker image flashes even when only a little of the preceding vehicle departs outside the display region. As a result, the occupant may be caused to feel anxiety.

SUMMARY

The present disclosure provides a vehicle display control device, a vehicle display device, a display control method and a display control program that may suppress a cause of anxiety for an occupant.

A vehicle display control device according to a first aspect controls a vehicle display device, the vehicle display device displaying an image in a display region superimposed on a portion of a forward view from a vehicle, and the vehicle display control device including: a preceding vehicle detection section that detects a position of a preceding vehicle running in front of the vehicle; a departure perception section that, based on the position of the preceding vehicle, perceives whether or not an entirety of the preceding vehicle has departed from the display region; and a display control section that displays an acquisition image that is superimposed on or adjacent to the preceding vehicle in the display region in accordance with the position of the preceding vehicle and, when the entirety of the preceding vehicle departing from the display region is perceived by the departure perception section, displays the acquisition image as a flashing display at an end portion at a side of the display region at which the entirety of the preceding vehicle has departed.

In the vehicle display control device according to the first aspect, in accordance with the position of the preceding vehicle, the acquisition image is displayed in the display region superimposed on or adjacent to the preceding vehicle. When the departure perception section perceives that the entirety of the preceding vehicle has departed from the display region, the acquisition image is displayed as a flashing display at the end portion at the side of the display region through which the entirety of the preceding vehicle has departed.

Thus, the acquisition image is displayed as a flashing display when the entirety of the preceding vehicle departing from the display region is perceived, but the acquisition image is displayed as a non-flashing display when only a portion of the preceding vehicle has departed from the display region. Therefore, a cause of anxiety for a vehicle occupant may be suppressed. Note that the meaning of the term "displaying—superimposed" as used herein is not intended to be limited to an acquisition image being displayed superimposed on a preceding vehicle seen through a windshield glass but is intended to encompass a broader meaning including an acquisition image being displayed superimposed on an image of a preceding vehicle that is displayed at a display screen inside a cabin or the like.

In a vehicle display control device according to a second aspect, in the first aspect, when the entirety of the preceding vehicle departing from the display region is perceived by the departure perception section, the display control section displays the acquisition image as the flashing display after a certain duration has passed after the perception.

In the vehicle display control device according to the second aspect, when the entirety of the preceding vehicle is perceived to have departed from the display region, the display control section displays the acquisition image as the flashing display after the certain duration has passed from this perception. Therefore, because the certain duration is allowed to pass after the perception, a hunting effect that would occur at a time of the preceding vehicle switching from the inside to the outside of the display region may be prevented.

In a vehicle display control device according to a third aspect, in the first aspect or the second aspect, when at least a portion of the preceding vehicle returning from outside to inside the display region is perceived by the departure perception section, the display control section displays the acquisition image as a non-flashing display after a certain duration has passed after the perception.

In the vehicle display control device according to the third aspect, when at least a portion of the preceding vehicle is perceived to have returned from outside to inside the display region, the display control section displays the acquisition image as the non-flashing display after the certain duration has passed from this perception. Therefore, a hunting effect that would occur at a time of the preceding vehicle switching back from the outside to the inside of the display region may be prevented.

In a vehicle display control device according to a fourth aspect, in any one of the first to third aspects, the display control section raises a flashing rate of the flashing display in association with the preceding vehicle moving further from the display region.

In the vehicle display control device according to the fourth aspect, the display control section raises the flashing rate of the flashing display as the preceding vehicle moves further from the display region. Therefore, the occupant may visually discern distances between the display region and the preceding vehicle from different flashing rates of the flashing display.

In a vehicle display control device according to a fifth aspect, in the fourth aspect, the display control section raises the flashing rate in steps.

In the vehicle display control device according to the fifth aspect, because the display control section raises the flashing rate in a stepwise manner, the display may compensate for errors in calculations of distance between the display region and the preceding vehicle.

In a vehicle display control device according to a sixth aspect, in any one of the first to fifth aspects, the display region is a projection screen projected onto by a head-up display at the vehicle front of a driver seat.

In the vehicle display control device according to the sixth aspect, because the display region is a projection screen projected onto by the head-up display device at the front in the vehicle of the driver seat, the acquisition image is displayed superimposed on a forward view from the driver seat. Therefore, the occupant of the driver seat may see the position of the preceding vehicle without moving their cycline greatly.

A vehicle display device according to a seventh aspect includes: a display unit that is provided in a cabin of a vehicle and includes a display region; and a vehicle display control device according to any one of the first to sixth aspects.

The vehicle display device according to the seventh aspect is provided with the display unit including the display region provided in the cabin of the vehicle and with the vehicle display control device. Because the vehicle display control device is the vehicle display control device according to any one of the first to sixth aspects, the operation and effects described above can be provided.

A display control method according to an eighth aspect is a display method for displaying an image in a display region superimposed on a portion of a forward view from a vehicle, the display control method including: detecting a position of a preceding vehicle running in front of the vehicle; based on the position of the preceding vehicle, perceiving whether or not an entirety of the preceding vehicle has departed from the display region; and displaying an acquisition image that is superimposed on or adjacent to the preceding vehicle in the display region in accordance with the position of the preceding vehicle and, when the entirety of the preceding vehicle departing from the display region is perceived, displaying the acquisition image as a flashing display at an end portion at a side of the display region at which the entirety of the preceding vehicle has departed.

In the display control method according to the eighth aspect, in accordance with the position of the preceding vehicle, the acquisition image is displayed in the display region superimposed on or adjacent to the preceding vehicle. When the entirety of the preceding vehicle is perceived to have departed from the display region, the acquisition image is displayed as a flashing display at the end portion at the side of the display region through which the entirety of the preceding vehicle has departed. Thus, the acquisition image is displayed as a flashing display when the entirety of the preceding vehicle departing from the display region is perceived, but the acquisition image is displayed as a non-flashing display when only a portion of the preceding vehicle has departed from the display region. Therefore, a cause of anxiety for a vehicle occupant may be suppressed.

A display control program according to a ninth aspect is a program for displaying an image in a display region superimposed on a portion of a forward view from a vehicle, the display control program being executable by a computer to perform processing including: detecting a position of a preceding vehicle running in front of the vehicle; based on the position of the preceding vehicle, perceiving whether or not an entirety of the preceding vehicle has departed from the display region; and displaying an acquisition image that is superimposed on or adjacent to the preceding vehicle in the display region in accordance with the position of the preceding vehicle and, when the entirety of the preceding vehicle departing from the display region is perceived, displaying the acquisition image as a flashing display at an end portion at a side of the display region at which the entirety of the preceding vehicle has departed.

In the display control program according to the ninth aspect, in accordance with the position of the preceding vehicle, the computer displays the acquisition image in the display region superimposed on or adjacent to the preceding vehicle. When the computer perceives that the entirety of the preceding vehicle has departed from the display region, the computer displays the acquisition image as a flashing display at the end portion at the side of the display region through which the entirety of the preceding vehicle has departed. Thus, the acquisition image is displayed as a flashing display when the entirety of the preceding vehicle departing from the display region is perceived, but the acquisition image is displayed as a non-flashing display when only a portion of the preceding vehicle has departed from the display region. Therefore, a cause of anxiety for a vehicle occupant may be suppressed.

As described above, an excellent effect is provided in that the vehicle display control device, vehicle display device, display control method and display control program according to the present disclosure may suppress a cause of anxiety for a vehicle occupant.

BRIEF DESCRIPTION OF THE DRAWINGS

Exemplary embodiments of the present invention will be described in detail based on the following figures, wherein:

FIG. 6 is a view showing another example of the windshield glass seen by the occupant of the driver seat;

FIG. 7 is a flowchart showing an example of a flow of display processing according to the present exemplary embodiment.

DETAILED DESCRIPTION

A vehicle display device 10 according to an exemplary embodiment of the present disclosure is employed in a vehicle 12, which is described with reference to the drawings. The arrow UP marked in FIG. 1 indicates the upper side in a vehicle vertical direction and the arrow RH indicates the right side in a vehicle width direction. The vertical direction and left-and-right direction referred to in the descriptions below refer to, respectively, upper and lower in the vehicle vertical direction and left and right in the vehicle width direction.

Figure 1:
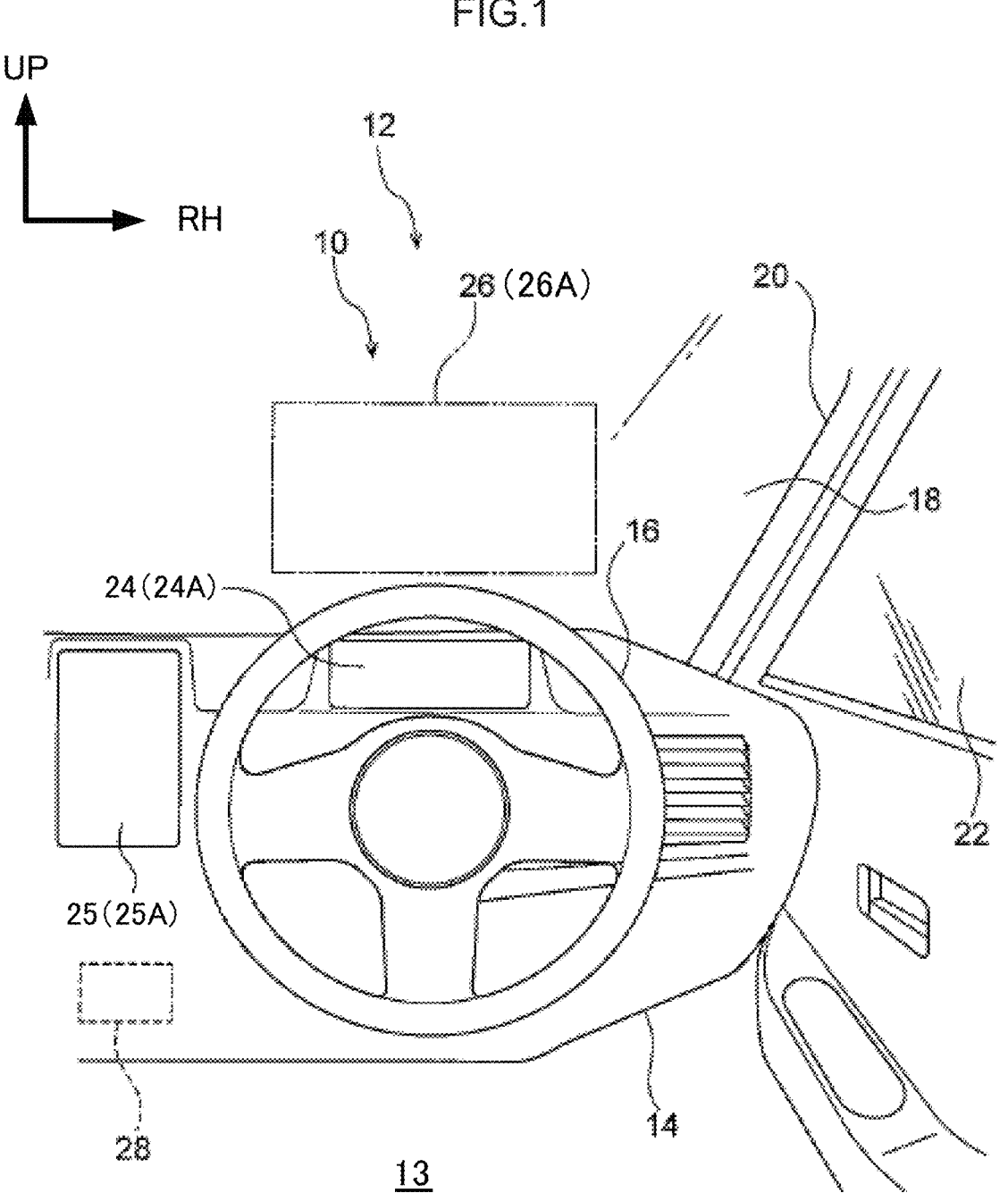
FIG. 1 is a schematic view of a front portion of a cabin interior of a vehicle in which a vehicle display device according to a present exemplary embodiment is employed, seen from the vehicle rear side.

As shown in FIG. 1, an instrument panel 14 is provided at a front portion of the interior of a cabin 13 of the vehicle 12. The instrument panel 14 extends in the vehicle width direction, and a steering wheel 16 is provided at the vehicle right side of the instrument panel 14. That is, as an example in the present exemplary embodiment, the vehicle is a "right-hand drive" car in which the steering wheel 16 is provided at the right side and a driver seat is set at the vehicle right side. A windshield glass 18 is provided at a front end portion of the instrument panel 14.

The windshield glass 18 extends to the vehicle upper side from the front end portion of the instrument panel 14, dividing the cabin exterior of the vehicle 12 from the interior of the cabin 13. A vehicle right side end portion of the windshield glass 18 is fixed to a vehicle right side front pillar 20. The front pillar 20 extends in the vehicle vertical direction, and the windshield glass 18 is fixed to a vehicle width direction inner side end portion of the front pillar 20. A front end portion of a front side glass 22 is fixed to a vehicle width direction outer side end portion of the front pillar 20. A vehicle left side end portion of the windshield glass 18 is fixed to a vehicle left side front pillar, which is not shown in the drawings.

A first display unit 24 equipped with an image display region 24A is provided at the instrument panel 14. The first display unit 24 is constituted by an instrument cluster display provided at the vehicle right side of the instrument panel 14 at the vehicle front of the driver seat. The first display unit 24 is connected with various instrument devices mounted in the vehicle 12. The first display unit 24 is provided at a position within a field of view of a driver in a state in which the eyeline of the driver is oriented to the vehicle front.

A second display unit 25 equipped with an image display region 25A is provided at the instrument panel 14. The second display unit 25 is structured by a center display screen provided at a central portion in the vehicle width direction of the instrument panel 14.

A third display unit 26 including an image display region 26A is provided at the windshield glass 18. The third display unit 26 is provided at the vehicle upper side relative to the first display unit 24. The display region 26A is constituted by a projection screen that is projected onto by a head-up display (HUD) device 44 (see FIG. 2). Specifically, the head-up display device 44 is provided at the vehicle front side of the instrument panel 14, and the head-up display device 44 is structured to project images onto the display region 26A of the third display unit 26 of the windshield glass 18. That is, the third display unit 26 is a portion of the windshield glass 18 that serves as the projection screen of the head-up display device 44.

—Hardware Structures of the Vehicle Display Device 10—

Figure 2:
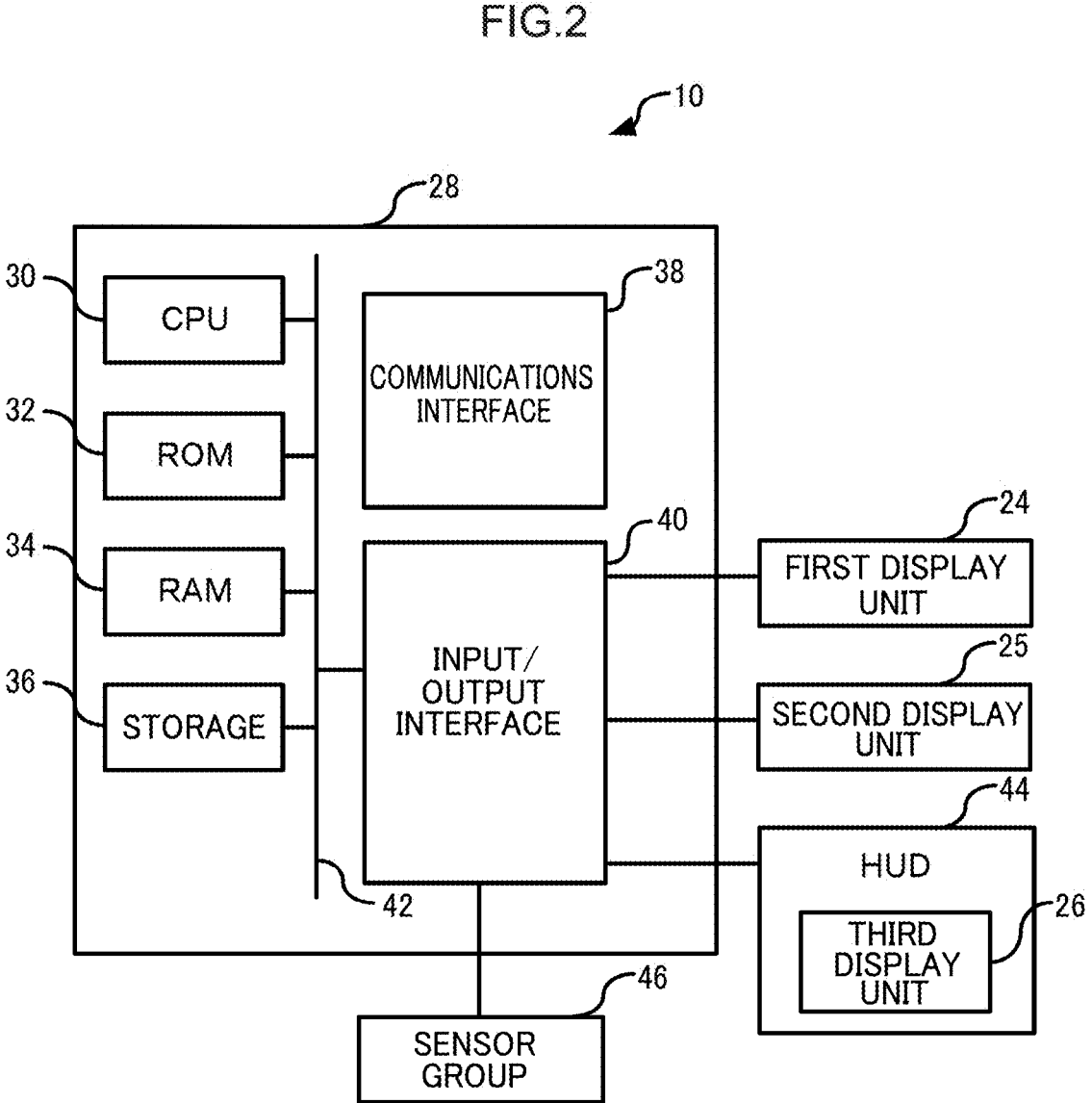
FIG. 2 is a block diagram showing hardware structures of the vehicle display device according to the present exemplary embodiment.

An electronic control unit (ECU) 28, which is a control section of the vehicle display device 10, is provided to serve as a vehicle display control device. FIG. 2 is a block diagram showing hardware structures of the vehicle display device 10.

As shown in FIG. 2, the ECU 28 of the vehicle display device 10 includes a central processing unit (CPU) 30, read-only memory (ROM) 32, random access memory (RAM) 34, storage 36, a communications interface 38 and an input/output interface 40. These structures are connected to be capable of communicating with one another via a bus 42.

The CPU 30 is a central arithmetic processing unit that executes various programs and controls respective parts. That is, the CPU 30 serving as a processor reads a program from the ROM 32 serving as memory or the storage 36 serving as the memory and executes the program using the RAM 34 as a workspace. The CPU 30 performs control of the structures described above and various kinds of computational processing and the like in accordance with programs memorized in the ROM 32 or the storage 36.

The ROM 32 stores various programs and various kinds of data. The RAM 34 serves as a workspace, temporarily storing programs and data. The storage 36 includes a hard disk drive (HDD) or solid state drive (SSD). The storage 36 stores various programs, including an operating system, and various kinds of data. In the present exemplary embodiment, the ROM 32 or the storage 36 stores a program for implementing display processing, and various kinds of data and the like.

The communications interface 38 is an interface for the vehicle display device 10 to communicate with a server and other equipment, which are not shown in the drawings. The communications interface 38 employs a standard such as, for example, Ethernet (registered trademark), LTE, FDDI, Wi-Fi (registered trademark) or the like.

The first display unit 24, the second display unit 25, the head-up display device (HUD) 44 and a sensor group 46 are connected to the input/output interface 40. Images are projected onto the third display unit 26 by the head-up display device 44.

The sensor group 46 includes plural sensors among various sensors, such as cameras, radar, lidar ("light detection and ranging" or "laser imaging detection and ranging"), a GPS (global positioning system) sensor and so forth. The cameras image the vicinity of the vehicle 12. Cameras according to the present exemplary embodiment include at least a front camera that images forward of the vehicle.

The radar detects distances and directions of objects in the vicinity of the vehicle 12 with electromagnetic waves. The lidar detects distances and directions of objects in the vicinity of the vehicle 12 with laser light. The GPS sensor detects a current position of the vehicle 12. In the present exemplary embodiment, the radar and lidar are provided with a signal processing section (not shown in the drawings) that includes functions for processing detection results of objects in the vicinity. Based on changes in relative positions and relative speeds and the like of individual objects included in plural recent sets of detection results, the signal processing section removes noise, roadside structures that are non-moving objects such as guard rails, and so forth, and the signal processing section tracks and monitors moving objects such as walking people, other vehicles and so forth. The sensor group 46 also includes sensors that detect an eyeline position of a vehicle occupant and the like.

—Functional Structures of the Vehicle Display Control Device 28—

The vehicle display control device 28 uses the hardware resources described above to realize various functions. The functional structures realized by the vehicle display control device 28 are described with reference to FIG. 3.

Figure 3:
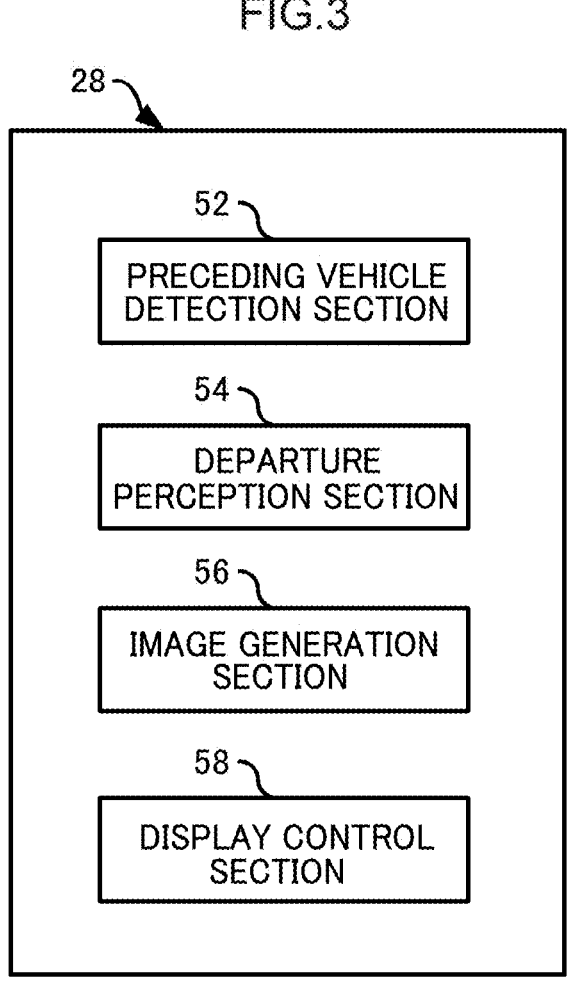
FIG. 3 is a block diagram showing functional structures of the vehicle display device according to the present exemplary embodiment.

As shown in FIG. 3, the vehicle display control device 28 includes, as functional structures, a preceding vehicle detection section 52, a departure perception section 54, an image generation section 56 and a display control section 58. These functional structures are realized by the CPU 30 reading and executing a program memorized in the ROM 32 or storage 36.

The preceding vehicle detection section 52 acquires information relating to positions of a preceding vehicle 60 running in front of the vehicle 12. More specifically, the preceding vehicle detection section 52 acquires information of the preceding vehicle 60 detected by the sensor group 46. For example, the preceding vehicle detection section 52 acquires captured image data to the front of the vehicle that has been imaged by the front camera and, based on acquired captured image data of the preceding vehicle 60, detects coordinate data of the preceding vehicle 60 in y and z directions. The y direction referred to herein is the left-and-right direction of the vehicle 12, and the z direction is the vertical direction of the vehicle 12. An x direction is the front-and-rear direction of the vehicle 12.

Figure 4:
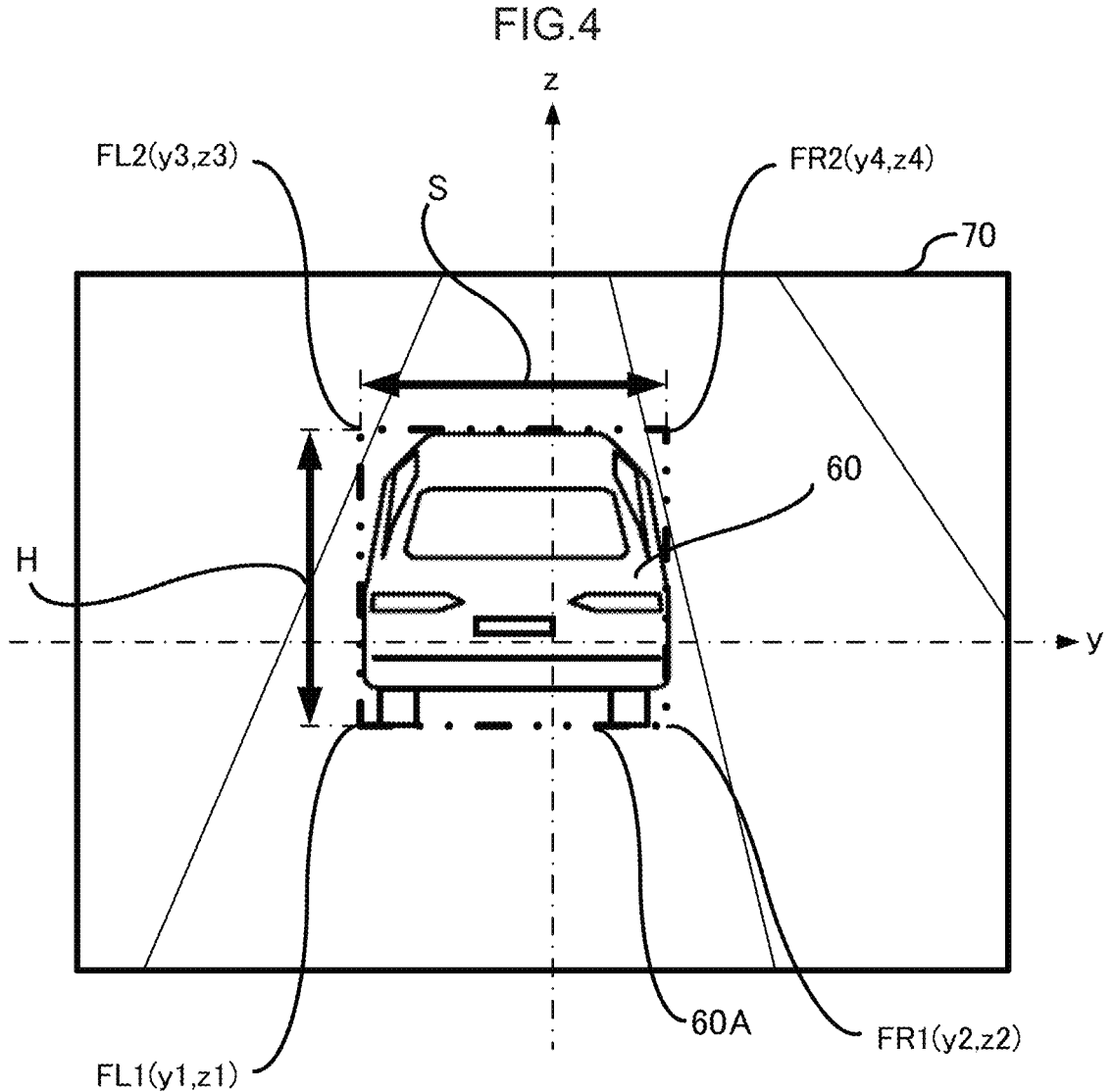
FIG. 4 is an exemplary view showing an example of a captured image obtained by a front camera.

FIG. 4 is an exemplary view showing an example of a captured image 70 depicting captured image data to the front of the vehicle imaged by the front camera. As illustrated in FIG. 4, the preceding vehicle detection section 52 sets a horizontal direction in the captured image 70 as the y axis and sets the vertical direction as the z axis. In the present exemplary embodiment, the front camera is located at the vehicle width direction center of the cabin interior at a front portion of the vehicle 12. In the present exemplary embodiment, the center of the captured image 70 serves as an origin point.

By analyzing the captured image 70, the preceding vehicle detection section 52 detects the preceding vehicle 60 located in front of the vehicle 12, and the preceding vehicle detection section 52 detects positions of the preceding vehicle 60 relative to the vehicle 12 and a shape of the preceding vehicle 60. For example, in FIG. 4 the preceding vehicle detection section 52 detects the preceding vehicle 60 from the captured image 70, specifies a rectangular frame 60A surrounding the preceding vehicle 60 (depicted by two-dot chain lines in FIG. 4), and detects an x-axis direction width S and a y-axis direction height H of the frame 60A to serve as size information of the preceding vehicle 60.

The preceding vehicle detection section 52 detects, as sets of coordinate data of the preceding vehicle 60, for example, a coordinate FL1 (y1, z1) of a lower-left corner of the frame 60A, a coordinate FR1 (y2, z2) of a lower-right corner of the frame 60A, a coordinate FL2 (y3, z3) of an upper-left corner of the frame 60A, and a coordinate FR2 (y4, z4) of an upper-right corner of the frame 60A.

The departure perception section 54 perceives, based on positions of the preceding vehicle 60, whether or not an entirety of the preceding vehicle 60 has departed from the display region 26A of the third display unit 26. More specifically, for example, positional coordinates corresponding to the display region 26A are specified at the departure perception section 54 in advance. The departure perception section 54 makes a determination as to whether the four sets of coordinate data representing the positions of the preceding vehicle 60 detected by the preceding vehicle detection section 52 (FL1 (y1, z1), FR1 (y2, z2), FL2 (y3, z3) and FR2 (y4, z4)) are inside or outside the display region 26A. When the four sets of coordinate data are outside the display region 26A, the departure perception section 54 perceives that the entirety of the preceding vehicle 60 has departed from the display region 26A of the third display unit 26.

Figure 5:
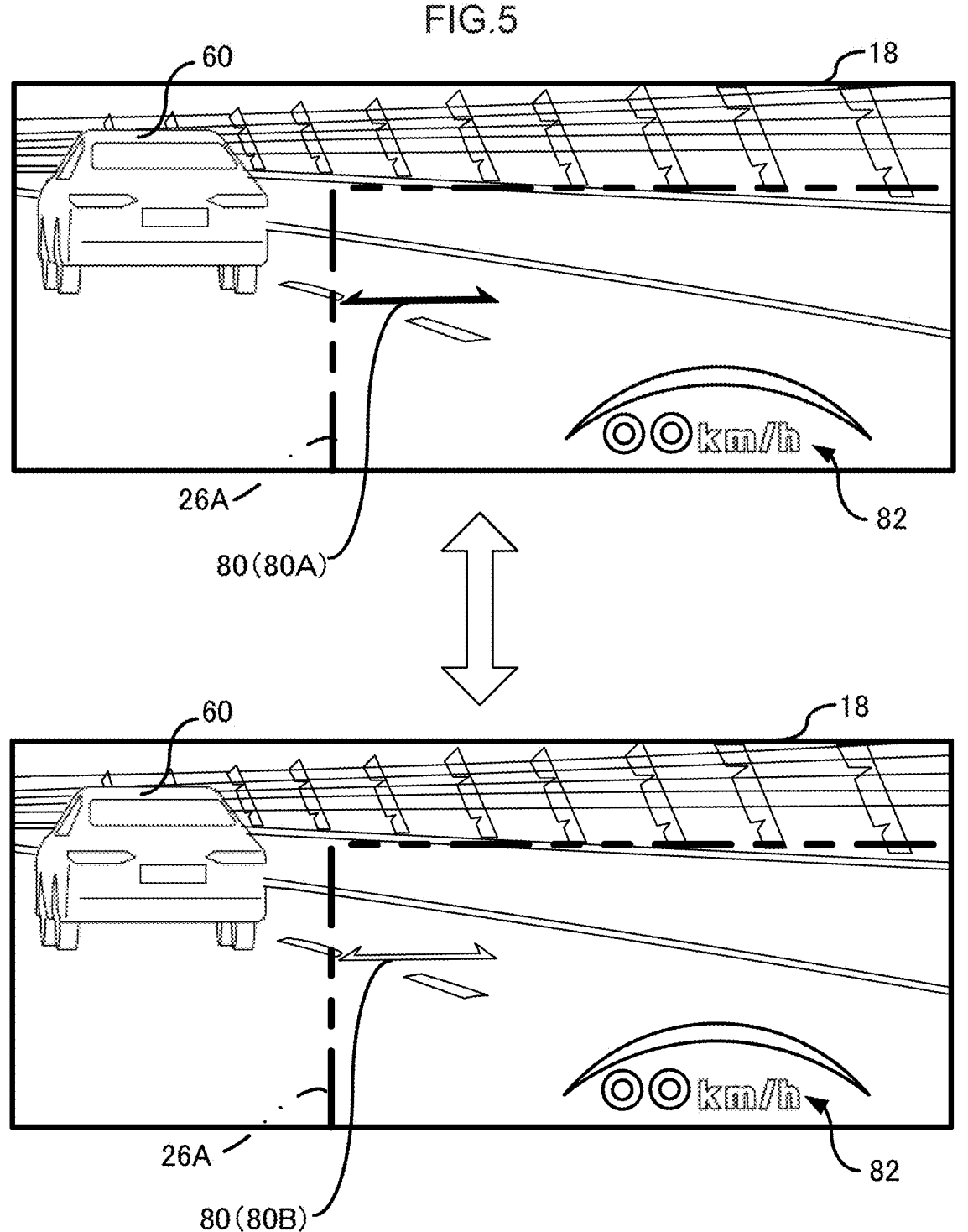
FIG. 5 is a view showing examples of a windshield glass seen by an occupant of a driver seat.
Figure 6:
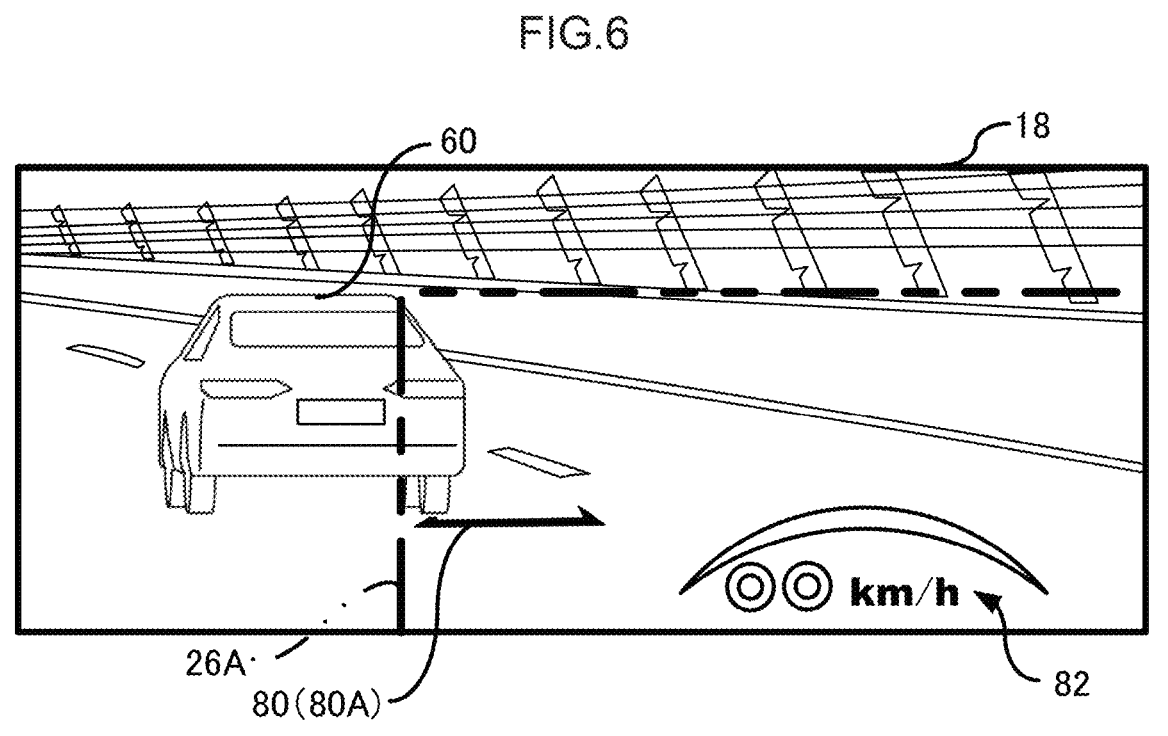

The image generation section 56 generates images for display at the third display unit 26 that is the projection screen of the head-up display device 44. FIG. 5 and FIG. 6 are images showing respective examples of the windshield glass 18 seen by an occupant of the driver seat. The windshield glass 18 is depicted with a rectangular shape in FIG. 5 and FIG. 6 but is not strictly rectangular in practice.

As illustrated in FIG. 5 and FIG. 6, an image generated by the image generation section 56 includes, for example, an instrument cluster image 82 representing an instrument display showing a running speed of the vehicle 12, various images for purposes of assisting manual driving and autonomous driving, and so forth.

In particular in the present exemplary embodiment, when the departure perception section 54 determines that the entirety of the preceding vehicle 60 has departed from the display region 26A of the third display unit 26, the image generation section 56 generates a first acquisition image 80A and a second acquisition image 80B to serve as an acquisition image 80, which indicates that the preceding vehicle 60 has been acquired. In the present exemplary embodiment, as an example, the first acquisition image 80A and the second acquisition image 80B are formed with the same shape but the first acquisition image 80A is formed with more emphatic color and brightness than the second acquisition image 80B. As an example in the present exemplary embodiment, the acquisition image 80 is formed as a two-headed arrow, as illustrated in FIG. 5 and FIG. 6.

When a plural number of the preceding vehicle 60 are detected, the image generation section 56 generates the acquisition image 80 for each detected preceding vehicle 60. As an example, the colors of the first acquisition images 80A may be different colors for the respective preceding vehicles 60. Generation of the acquisition images 80 by the image generation section 56 is conducted in advance and the acquisition images 80 are memorized in, for example, the storage 36.

The display control section 58 includes functions for displaying images generated by the image generation section 56 in the display region 26A of the third display unit 26 and functions for erasing the images displayed in the display region 26A.

The display control section 58 displays various images at the display region 26A of the third display unit 26 such that the images blend with the forward view of the vehicle 12 that the occupant of the driver seat sees through the third display unit 26 (the windshield glass 18). In particular in the present exemplary embodiment, in accordance with a position of the preceding vehicle 60, the display control section 58 displays the acquisition image 80 in the display region 26A of the third display unit 26 superimposed on or adjacent to the preceding vehicle 60. When the departure perception section 54 perceives that the entirety of the preceding vehicle 60 has departed from the display region 26A, the display control section 58 displays the acquisition image 80 as a flashing display at an end portion at a side of the display region 26A at which the entirety of the preceding vehicle 60 has departed. As an example in the present exemplary embodiment, the display control section 58 displays the acquisition image 80 adjacent to a lower end portion of the preceding vehicle 60.

As an example in the present exemplary embodiment, when the departure perception section 54 perceives that the entirety of the preceding vehicle 60 has departed through the left end of the display region 26A, the display control section 58 displays the acquisition image 80 at a left end portion of the display region 26A. More specifically, the display control section 58 displays the first acquisition image 80A and the second acquisition image 80B alternating at a constant interval. The display control section 58 displays the acquisition image 80, meaning the first acquisition image 80A and the second acquisition image 80B, magnified or reduced such that the length of the two-headed arrow corresponds with the magnitude of the width S detected as size information by the preceding vehicle detection section 52. The display control section 58 also, for example, rotates the display of the acquisition image 80, meaning the first acquisition image 80A and the second acquisition image 80B, such that an orientation of the two-headed arrow matches an orientation of the lower end line of the frame 60A illustrated in FIG. 4.

Similarly, when the departure perception section 54 perceives that the entirety of the preceding vehicle 60 has departed through the right end of the display region 26A, the display control section 58 displays the acquisition image 80 at a right end portion of the display region 26A, and when the departure perception section 54 perceives that the entirety of the preceding vehicle 60 has departed through the upper end of the display region 26A, the display control section 58 displays the acquisition image 80 at an upper end portion of the display region 26A.

As illustrated in FIG. 6, when the entirety of the preceding vehicle 60 has not departed from the display region 26A, that is, when only a portion of the preceding vehicle 60 has departed from the display region 26A or the entirety of the preceding vehicle 60 is disposed inside the display region 26A, the first acquisition image 80A is displayed in accordance with the position of the preceding vehicle 60. Thus, the acquisition image is displayed continuously without flashing.

As an example in the present exemplary embodiment, when the departure perception section 54 perceives that the entirety of the preceding vehicle 60 has departed from the display region 26A, the display control section 58 displays the acquisition image 80 as a flashing display after a certain duration has passed from this perception. Further, if the departure perception section 54 perceives at least a portion of the preceding vehicle 60 returning from outside to inside the display region 26A, the display control section 58 displays the acquisition image 80 as a non-flashing display after a certain duration has passed from this perception.

—Operation—

Now, operation of the present exemplary embodiment is described.

—Display Processing—

Figure 7:
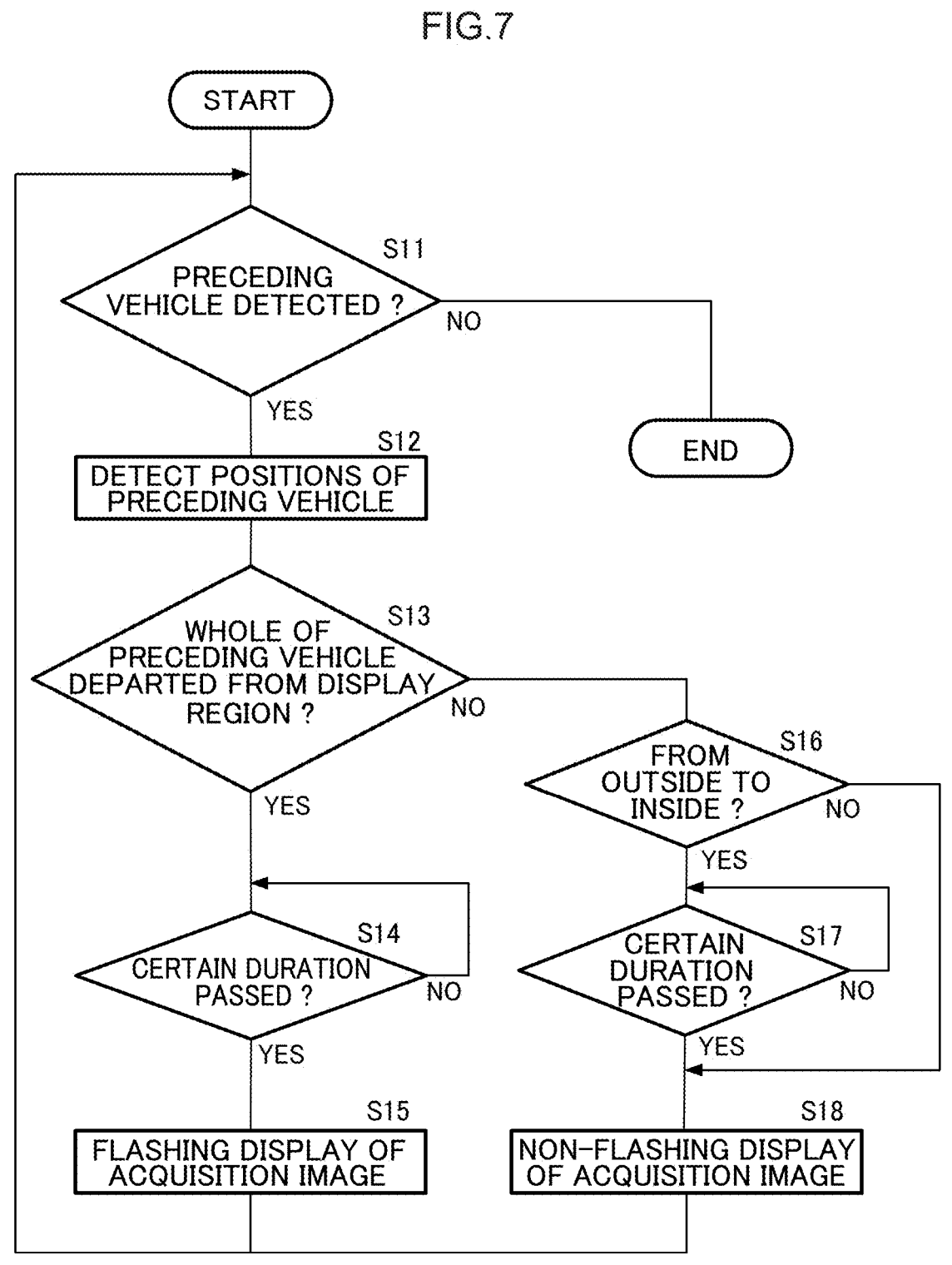

An example of display processing to display the acquisition image 80 in the third display unit 26 that is the projection screen of the head-up display device 44 is described using the flowchart shown in FIG. 7. This display processing is implemented by the CPU 30 reading a display control program from the ROM 32 or storage 36, loading the program into the RAM 34, and executing the program.

As shown in FIG. 7, in step S11 the CPU 30 makes a determination as to whether a preceding vehicle 60 is detected. More specifically, the CPU 30 makes a determination with the functions of the preceding vehicle detection section 52 as to whether the preceding vehicle 60 is present in the captured image 70 imaged by the front camera included in the sensor group 46.

When no preceding vehicle 60 is detected, the result of the determination in step S11 is negative and the CPU 30 ends the display control processing. On the other hand, when the preceding vehicle 60 is detected, the result of the determination in step S11 is affirmative and the CPU 30 advances to the processing of step S12.

In step S12, the CPU 30 detects positions of the preceding vehicle 60. More specifically, the CPU 30 acquires information about the preceding vehicle 60 detected by the sensor group 46 with the functions of the preceding vehicle detection section 52. Based on this information, the CPU 30 detects the coordinates FR1 (y2, z2) of the lower-right corner of the frame 60A of the preceding vehicle 60, the coordinates FL2 (y3, z3) of the upper-left corner of the frame 60A and the coordinate FR2 (y4, z4) of the upper-right corner of the frame 60A as described above to serve as coordinate data of the preceding vehicle 60.

In step S13, the CPU 30 makes a determination as to whether the entirety of the preceding vehicle 60 has departed from the display region 26A. More specifically, the CPU 30 makes a determination as to whether the aforementioned sets of coordinate data—FL1 (y1, z1), FR1 (y2, z2), FL2 (y3, z3) and FR2 (y4, z4)—are inside or outside the display region 26A of the captured image 70. When these sets of coordinate data are outside the display region 26A, the CPU 30 perceives that the entirety of the preceding vehicle 60 has departed from the display region 26A. Accordingly, the result of the determination in step S13 is affirmative and the CPU 30 advances to the processing of step S14.

In step S14, the CPU 30 makes a determination as to whether a certain duration has passed with a timer (not shown in the drawings) installed at the vehicle display control device 28. When the certain duration has not passed, the result of the determination in step S14 is negative and the CPU 30 repeats the processing of step S14 until the certain duration passes. On the other hand, when the certain duration has passed, the result of the determination in step S14 is affirmative and the CPU 30 advances to the processing of step S15.

In step S15, the CPU 30 displays the acquisition image 80 as a flashing display. More specifically, with the functions of the display control section 58, the CPU 30 alternatingly displays the first acquisition image 80A and second acquisition image 80B generated by the functions of the image generation section 56 in the display region 26A of the third display unit 26. Thus, the acquisition image 80 is displayed as a flashing display at an end portion at the side of the display region 26A through which the entirety of the preceding vehicle 60 has departed (see FIG. 5).

Alternatively, in step S13, when the CPU 30 determines that at least one of the sets of coordinate data is inside the display region 26A of the captured image 70, the CPU 30 perceives that the preceding vehicle 60 has not wholly departed from the display region 26A, that is, that at least a portion of the preceding vehicle 60 is disposed in the display region 26A. Accordingly, the result of the determination in step S13 is negative and the CPU 30 advances to the processing of step S16.

In step S16, the CPU 30 makes a determination with the functions of the departure perception section 54 as to whether the preceding vehicle 60 has returned from outside to inside the display region 26A. When the preceding vehicle 60 has not returned from outside to inside the display region 26A, the preceding vehicle 60 has been continuously inside the display region 26A, the result of the determination in step S16 is negative, and the CPU 30 advances to the processing of step S18. On the other hand, when the preceding vehicle 60 has returned from outside to inside the display region 26A, the result of the determination in step S16 is affirmative and the CPU 30 advances to the processing of step S17.

In step S17, the CPU 30 makes a determination as to whether a certain duration has passed with the timer (not shown in the drawings) installed at the vehicle display control device 28. When the certain duration has not passed, the result of the determination in step S17 is negative and the CPU 30 repeats the processing of step S17 until the certain duration passes. On the other hand, when the certain duration has passed, the result of the determination in step S17 is affirmative and the CPU 30 advances to the processing of step S18.

In step S18, the CPU 30 displays the acquisition image 80 as a non-flashing display adjacent to the preceding vehicle 60. More specifically, with the functions of the display control section 58, the CPU 30 displays the first acquisition image 80A generated by the functions of the image generation section 56 in the display region 26A of the third display unit 26. Thus, the first acquisition image 80A is displayed continuously without flashing adjacent to the lower end of the preceding vehicle 60 (see FIG. 6).

The CPU 30 advances to the processing of step S11, while continuing the processing of step S15 or step S18, and makes a determination with the functions of the preceding vehicle detection section 52 as to whether the previously acquired preceding vehicle 60 is detected. When the preceding vehicle 60 is detected, the result of the determination in step S11 is affirmative and the CPU 30 continues on to the processing from step S12 onward. On the other hand, when the preceding vehicle 60 is not detected, the result of the determination in step S11 is negative and the CPU 30 ends the display control processing.

As described above, in the vehicle display device 10 and vehicle display control device 28 according to the present exemplary embodiment, in accordance with the position of the preceding vehicle 60, the display control section 58 displays the acquisition image 80 in the display region superimposed on or adjacent to the preceding vehicle 60. When the departure perception section 54 perceives that the entirety of the preceding vehicle 60 has departed from the display region 26A, the display control section 58 displays the acquisition image 80 as a flashing display at an end portion at the side of the display region 26A at which the entirety of the preceding vehicle 60 has departed. Thus, the acquisition image 80 is displayed as a flashing display when the entirety of the preceding vehicle 60 is perceived to have departed from the display region 26A, but the acquisition image 80 is not displayed as a flashing display when just a portion of the preceding vehicle 60 has departed from the display region 26A. Therefore, a cause of anxiety for a vehicle occupant may be suppressed.

In the present exemplary embodiment, when the display control section 58 perceives that the entirety of the preceding vehicle 60 has departed from the display region 26A, the acquisition image 80 is displayed as the flashing display after a certain duration has passed from this perception. Therefore, because the certain duration is allowed to pass after the perception, a hunting effect that would occur at a time of the preceding vehicle 60 switching from the inside to the outside of the display region 26A may be prevented.

In the present exemplary embodiment, when at least a portion of the preceding vehicle 60 is perceived to have returned from outside to inside the display region 26A, the display control section 58 displays the acquisition image 80 as a non-flashing display after a certain duration has passed from this perception. Therefore, a hunting effect that would occur at a time of the preceding vehicle 60 switching back from the outside to the inside of the display region 26A may be prevented.

In the present exemplary embodiment, because the display region 26A is the projection screen that is projected onto by the head-up display device 44 at the vehicle front of the driver seat, the acquisition image 80 is displayed superimposed on a forward view from the driver seat. Therefore, an occupant of the driver seat may see the position of the preceding vehicle 60 without moving their cycline greatly.

In the exemplary embodiment described above, as illustrated in FIG. 5, when the acquisition image 80 is displayed as a flashing display, the display control section 58 alternates display between the first acquisition image 80A and the second acquisition image 80B at a constant interval, but the present disclosure is not limited thus.

First Variant Example

In a first variant example, the display control section 58 raises the flashing rate of the flashing display as the preceding vehicle 60 moves further from the display region 26A. More specifically, the display control section 58 varies the timing of the display switching between the first acquisition image 80A and the second acquisition image 80B. For example, the departure perception section 54 acquires coordinates of a position of the vehicle 12 detected by the GPS sensor of the sensor group 46. The departure perception section 54 then acquires coordinates of the position of the preceding vehicle 60 detected by the preceding vehicle detection section 52 in the y direction (the left-and-right direction) and the z direction (the vertical direction), acquires information of the size of the preceding vehicle 60 detected by the preceding vehicle detection section 52, and calculates a displacement in the x direction (the front-and-rear direction).

From these sets of information, the departure perception section 54 calculates distances in the x direction, y direction and z direction from the vehicle 12 to the preceding vehicle 60. As the preceding vehicle 60 moves further from the display region 26A, the greater the distance calculated by the departure perception section 54, the higher the flashing rate of the flashing display is raised, by the display control section 58 raising a switching rate of the display between the first acquisition image 80A and the second acquisition image 80B.

Thus, in the first variant example, because the display control section 58 raises the flashing rate of the flashing display in association with the preceding vehicle 60 moving further from the display region 26A, the occupant may visually discern distances between the display region 26A and the preceding vehicle 60 from different flashing rates of the flashing display.

In the first variant example described above, displacements in the x direction are calculated based on information of the size of the preceding vehicle 60 acquired from the captured image 70. However, the present disclosure is not limited thus. For example, displacements may be calculated based on distances between the vehicle 12 and the preceding vehicle 60 detected by radar or lidar of the sensor group 46.

Second Variant Example

A second variant example differs from the first variant example in that, for example, constant thresholds dividing distances into three steps are specified. A distance calculated by the departure perception section 54 is compared with the thresholds of the three steps and, based on the comparison results, the display control section 58 alters the flashing rate in the three steps.

Thus, in the second variant example, because the display control section 58 raises the flashing rate in a stepwise manner, the display may compensate for errors in calculations of distance between the display region 26A and the preceding vehicle 60.

Supplementary Descriptions

In the exemplary embodiment described above, a structure is described in which the display region showing the forward view of the vehicle is structured as the projection screen of the head-up display device 44, but the present disclosure is not limited thus. As in the variant example illustrated in FIG. 8, the acquisition image 80 may be displayed at a display region of the second display unit 25, which is a display screen provided at the instrument panel 14.

Figure 8:
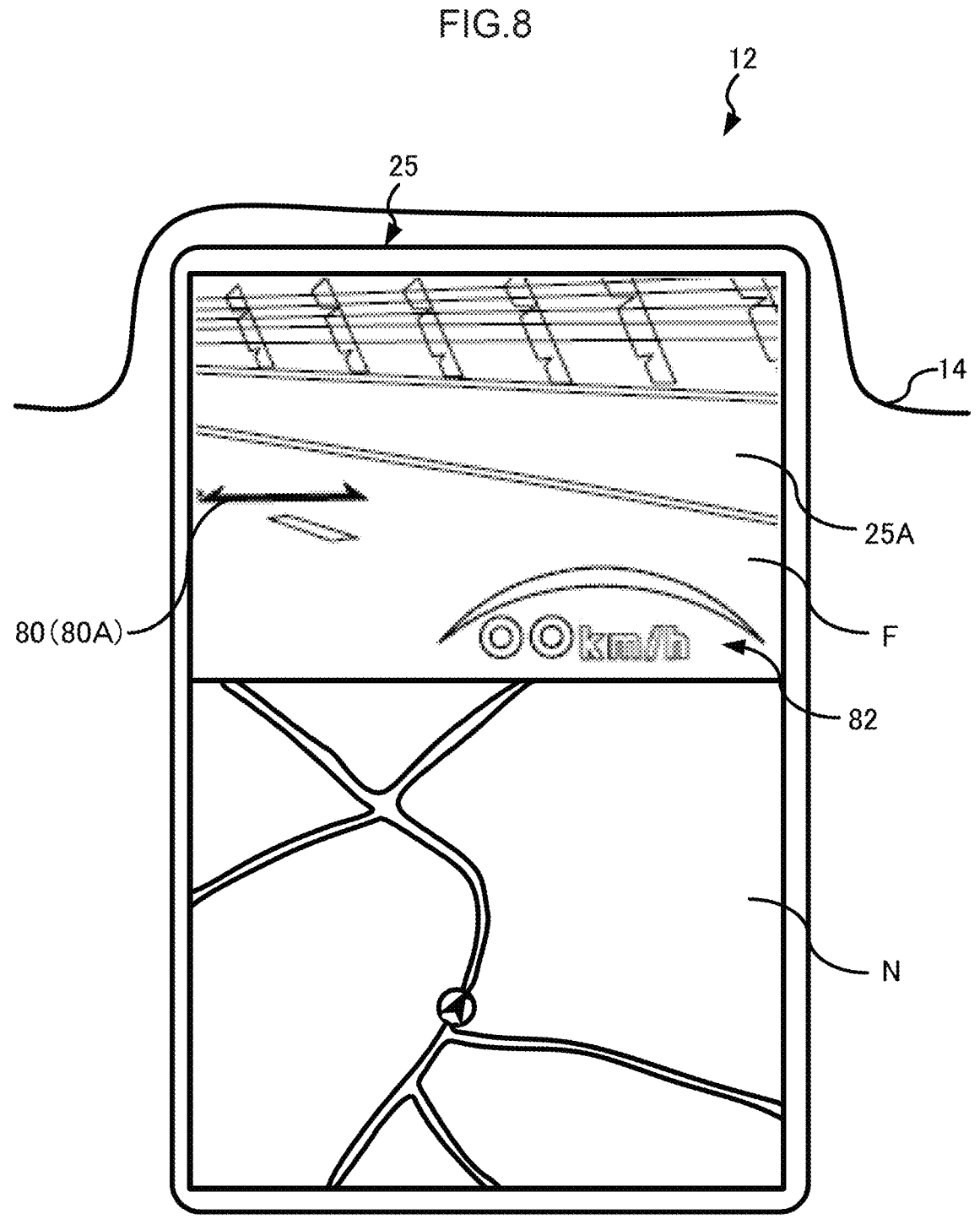
FIG. 8 is a schematic view showing a vehicle display device according to a variant example of the present exemplary embodiment.

As shown in FIG. 8, in the present variant example, the display region 25A of the second display unit 25 is vertically divided. In the second display unit 25 illustrated in FIG. 8, a map image N representing a current position of the vehicle 12 is displayed in the lower part of the display region, and a forward view image F representing a forward view of the vehicle is displayed in the upper part of the display region. The forward view image F is constituted by, for example, the captured image 70 imaged by the front camera structuring the sensor group 46. In contrast to the exemplary embodiment described above, in the second variant example, when the preceding vehicle 60 departs from the display region 25A, that is, when the preceding vehicle 60 is not located in the captured image 70, an acquisition image is displayed as a flashing display at an end portion at the side of the display region 25A at which the preceding vehicle 60 has departed.

Thus, in the present variant example, the acquisition image 80 is displayed at the second display unit 25 provided at the instrument panel 14, and when the preceding vehicle 60 departs from the display region 25A, the acquisition image is displayed as a flashing display at an end portion at the side of the display region 25A through which the preceding vehicle 60 has departed. Therefore, regardless of seating position, a cause of anxiety for an occupant seeing the second display unit 25 due to the flashing display may be suppressed, similarly to the exemplary embodiment described above.

Similarly, the acquisition image 80 may be displayed in the display region 24A of the first display unit 24, which is an instrument cluster display provided at the vehicle front of the driver seat. Because the first display unit 24 is provided to the vehicle front of the driver seat, an occupant of the driver seat may see the first display unit 24 by only slightly moving their eyeline from the forward view of the vehicle.

In the exemplary embodiment described above, a configuration is described that displays one of the acquisition image 80 in the display region, but the present disclosure is not limited thus. Configurations are possible in which, when a plural number of the preceding vehicle 60 are detected, a plural number of the acquisition image 80 are displayed in the display region. Further, the acquisition image 80 is not limited to a two-headed arrow shape but may be changed to various shapes. For example, the acquisition image may be a linear image structured by a solid line, a dotted line or the like, and may be a circle or the like.

In the exemplary embodiment described above, the frame 60A of the preceding vehicle 60 is specified in the captured image 70 and positional coordinates of the corners of the frame 60A are detected as positional coordinates of the preceding vehicle 60, but the present disclosure is not limited thus. For example, the shape of the preceding vehicle

60 may be extracted and positional coordinates of outermost points in the upper, lower, left and right directions may be detected.

In the exemplary embodiment described above, the acquisition image 80 is displayed so as to be adjacent to a lower end portion of the preceding vehicle 60. However, the acquisition image 80 may be displayed so as to be adjacent to an upper end portion, a left end portion or a right end portion of the preceding vehicle 60. Further, the acquisition image 80 may be disposed superimposed on the preceding vehicle 60.

In the exemplary embodiment described above, as a method for displaying the acquisition image 80 as a flashing display, the display control section 58 alternatingly displays the first acquisition image 80A and the second acquisition image 80B, but the present disclosure is not limited thus. For example, the display control section 58 may alternate between display and non-display of the first acquisition image 80A.

The various processes executed by the CPU 30 of the present exemplary embodiment, which is shown in FIG. 2, reading software (programs) may be executed by various kinds of processor other than a CPU. Examples of processors in these cases include a PLD (programmable logic device) in which a circuit configuration can be modified after manufacturing, such as an FPGA (field programmable gate array) or the like, a dedicated electronic circuit which is a processor with a circuit configuration that is specially designed to execute specific processing, such as an ASIC (application-specific integrated circuit) or the like, and so forth. The processing may be executed by one of these various kinds of processors, and may be executed by a combination of two or more processors of the same or different kinds (for example, plural FPGAs, a combination of a CPU with an FPGA, or the like). Hardware structures of these various kinds of processors are, to be more specific, electronic circuits combining circuit components such as semiconductor components and the like.

The programs described in the present exemplary embodiment may be provided in a mode of being memorized on a non-transitory memory medium, such as a CD-ROM (compact disc read-only memory), DVD-ROM (digital versatile disc read-only memory), USB (universal serial bus) memory or the like. Modes are also possible in which the program is downloaded from external equipment via a network.

An exemplary embodiment of the present disclosure is described above. However, the present disclosure is not limited by these descriptions and it will be clear that numerous modifications beyond these descriptions may be embodied within a technical scope not departing from the gist of the invention.

What is claimed is:

1. A vehicle display control device comprising memory and a processor coupled to the memory, the vehicle display control device controlling a display device such that, an acquisition image in accordance with a position of a preceding vehicle, is displayed in a display region superimposed on a portion of a forward view from a vehicle, and the processor being configured to perform control to:

display the acquisition image and flash the acquisition image in a case in which an entirety of the preceding vehicle had departed from the display region; and display the acquisition image but not flash the acquisition image in a case in which at least a portion of the preceding vehicle is inside the display region.

2. The vehicle display control device according to claim 1, wherein the processor is configured to flash the acquisition image after a certain duration has passed after the entirety of the preceding vehicle had departed from the display region, in a case in which the entirety of the preceding vehicle had departed from the display region.

3. The vehicle display control device according to claim 1, wherein the processor is configured to display the acquisition image but not flash the acquisition image after a certain duration has passed after at least a portion of the preceding vehicle had returned from outside to inside the display region, in a case in which at least a portion of the preceding vehicle had returned from outside to inside the display region.

4. The vehicle display control device according to claim 1, wherein the processor is configured to raise a flashing rate in association with the preceding vehicle moving further from the display region in a case in which the entirety of the preceding vehicle had departed from the display region.

5. The vehicle display control device according to claim 4, wherein the processor is configured to raise the flashing rate in steps in association with the preceding vehicle moving further from the display region.

6. The vehicle display control device according to claim 1, wherein the display region is a projection screen projected onto by a head-up display at a vehicle front of a driver seat.

7. A vehicle display device comprising:
a display unit that is provided in a cabin of a vehicle and includes a display region; and
the vehicle display control device according to claim 1.

8. A display control method executed by a processor for controlling a display device such that, an acquisition image in accordance with a position of a preceding vehicle, is displayed in a display region superimposed on a portion of a forward view from a vehicle, the display control method comprising:
displaying the acquisition image and flashing the acquisition image in a case in which an entirety of the preceding vehicle had departed from the display region; and
displaying the acquisition image but not flashing the acquisition image in a case in which at least a portion of the preceding vehicle is inside the display region.

9. The display control method according to claim 8, wherein the acquisition image is flashed after a certain duration has passed after the entirety of the preceding vehicle had departed from the display region, in a case in which the entirety of the preceding vehicle had departed from the display region.

10. The display control method according to claim 8, wherein the acquisition image is displayed but the acquisition image is not flashed after a certain duration has passed after at least a portion of the preceding vehicle had returned from outside to inside the display region, in a case in which at least a portion of the preceding vehicle had returned from outside to inside the display region.

11. The display control method according to claim 8, comprising raising a flashing rate in association with the preceding vehicle moving further from the display region in a case in which the entirety of the preceding vehicle had departed from the display region.

12. The display control method according to claim 11, wherein the flashing rate is raised in steps in association with the preceding vehicle moving further from the display region.

13. A non-transitory memory medium storing a program executable by a processor to perform display control processing for controlling a display device such that, an acquisition image in accordance with a position of a preceding vehicle, is displayed in a display region superimposed on a portion of a forward view from a vehicle, the display control processing comprising:
displaying the acquisition image and flashing the acquisition image in a case in which an entirety of the preceding vehicle had departed from the display region; and
displaying the acquisition image but not flashing the acquisition image in a case in which at least a portion of the preceding vehicle is inside the display region.

14. The non-transitory memory medium according to claim 13, wherein the display control processing comprises, flashing the acquisition image after a certain duration has passed after the entirety of the preceding vehicle had departed from the display region, in a case in which the entirety of the preceding vehicle had departed from the display region.

15. The non-transitory memory medium according to claim 13, wherein the display control processing comprises, displaying the acquisition image but not flashing the acquisition image after a certain duration has passed after at least a portion of the preceding vehicle had returned from outside to inside the display region, in a case in which at least a portion of the preceding vehicle had returned from outside to inside the display region.

16. The non-transitory memory medium according to claim 13, wherein the display control processing comprises raising a flashing rate in association with the preceding vehicle moving further from the display region in a case in which the entirety of the preceding vehicle had departed from the display region.

17. The non-transitory memory medium according to claim 16, wherein the display control processing comprises raising the flashing rate in steps in association with the preceding vehicle moving further from the display region.

* * * * *